United States Patent [19]

De Ceuster et al.

[11] 4,347,099

[45] Aug. 31, 1982

[54] PROCESS FOR THE RECLAMATION OF WASTE PAPER

[75] Inventors: Jean De Ceuster, Vilvoorde; Paul Essemaeker, Brussels, both of Belgium

[73] Assignee: Solvay & Cie., Brussels, Belgium

[21] Appl. No.: 207,761

[22] Filed: Nov. 17, 1980

Related U.S. Application Data

[63] Continuation of Ser. No. 758,869, Jan. 12, 1977, abandoned.

[30] Foreign Application Priority Data

Jan. 16, 1976 [LU] Luxembourg ............................ 74199
Aug. 4, 1976 [LU] Luxembourg ............................ 75528

[51] Int. Cl.³ .............................................. D21C 5/02
[52] U.S. Cl. .......................................... 162/5; 162/6; 162/8; 162/13; 162/72; 162/76; 162/78
[58] Field of Search ....................... 162/5, 6, 8, 78, 72, 162/76, 13

[56] References Cited

U.S. PATENT DOCUMENTS 3,248,277 4/1966 Gartner .................................. 162/5
3,856,755 12/1974 Vogt et al.
3,867,246 2/1975 Hebbel et al. .......................... 162/76
3,956,121 5/1976 Haschke et al.

FOREIGN PATENT DOCUMENTS 786464 11/1972 Belgium .
817678 1/1975 Belgium .
1904940 8/1970 Fed. Rep. of Germany .
1331843 5/1963 France .
48-4562 2/1973 Japan .
1273678 5/1972 United Kingdom .
1296412 11/1972 United Kingdom .

OTHER PUBLICATIONS

Champetier et al Introduction to Macromolecula-Chemistry Masson and Co. 1969 P 245-247.
Billmeye-Jr. Textbook of Pdyme Science 1962 P 429.

*Primary Examiner*—William F. Smith
*Attorney, Agent, or Firm*—Spencer & Kaye

[57] ABSTRACT

A process for the reclamation of waste paper in the presence of an aqueous alkaline solution comprises having the solution contain at least a carboxylated polymer.

33 Claims, No Drawings

PROCESS FOR THE RECLAMATION OF WASTE PAPER

This application is a continuation of Ser. No. 758,869, filed Jan. 12, 1977 abandoned.

BACKGROUND OF THE INVENTION

The present invention relates to a process for the reclamation of waste paper.

Waste paper from salvage is an important source of raw material for the paper industry, especially in the manufacture of packing papers and cardboards. As the rate of utilization of recovered fibers in packing products is already very high, other outlets for waste paper have also been considered, such as the manufacture of printing/writing paper or that of tissue paper. In this case, it is important to have an initial pulp with a sufficient degree of whiteness. This degree of whiteness can be obtained by resorting to the so-called de-inking and-/or bleaching techniques which comprise especially a disintegration stage for waste paper in a pulper and an ink elimination stage by washing or flotation. Other stages, such as, for example, vat storage, elimination of heavy and light impurities, breaking down of agglomerates, elimination of inks by washing or flotation, are in general also included in the treatment cycle.

During the disintegration stage, waste paper is put into the pulper at the same time as an aqueous alkaline solution. The latter can contain an alkaline hydroxide, such as sodium hydroxide, a mixture of alkali metal hydroxide, and, more particularly, sodium hydroxide, with hydrogen peroxide or again an alkali metal peroxide, such as sodium peroxide.

In addition to these compounds, the aqueous alkaline solution can also contain other additives, such as sodium silicate, possibly mixed with derivatives, such as collectors or foaming agents in the case of de-inking by flotation or mixed with dispersants in the case of de-inking by washing. The presence of silicate allows a very marked improvement to be obtained in the results achieved especially as regards the dispersion of inks. In addition, when the alkaline solution contains a peroxide, the silicate has the advantage of stabilizing, at least partially, the peroxide. Aqueous solutions based on hydrogen peroxide, sodium silicate and sodium hydroxide are most often used.

In these conventional processes, the quantities of silicate to be employed are, however, very large. Moreover, silicate is sometimes troublesome since it produces precipitates which can choke the wires of paper machines, the pipes and the flotation cells. Also, when working in the presence of silicates, deposits are observed in the de-inking installation which can absorb the inks. In addition, when the pulp is used in the manufacture of tissue paper, papers with a rough feel are obtained which are not suitable for use. Finally, when working in the presence of a peroxide compound, such as hydrogen peroxide or sodium peroxide, in spite of the presence of silicate, a rather large consumption of peroxide compound is observed.

SUMMARY OF THE PRESENT INVENTION

There has now been found, in accordance with the present invention, a process which does not present the disadvantages cited above.

The present invention, as embodied and broadly described, provides a process for the reclamation of waste paper in the presence of an aqueous alkaline solution, wherein the aqueous alkaline solution contains at least a carboxylated polymer.

DETAILED DESCRIPTION OF THE INVENTION

The carboxylated polymers which can be used according to the present invention are polymers having a main carbon chain substituted by carboxyl groups —COOM where M represents hydrogen, an alkali metal atom or an ammonium group. Most often, M represents a hydrogen atom, a sodium or potassium atom or an ammonium group. Preferably, M represents the sodium atom or the hydrogen atom.

The carboxylated polymers which can be used in the practice of the present invention may have no other substituents than the carboxyl groups. They may be selected from the homo- or co-polymers of acrylic acid or of maleic acid.

The carboxylated polymers which can be used according to the present invention may also advantageously be substituted by one or several other substituents, such as, for example, halogen atoms, hydroxyl functional groups, alkyl chains which may or may not be substituted by hydroxyl functional groups or by halogens, and aryl groups, aralkyl groups or cycloalkyl groups which may or may not be substituted by hydroxyl functional groups or by halogens.

Among all the carboxylated polymers which can be used according to the present invention, the hydroxycarboxylated polymers are particularly suitable. The hydroxycarboxylated polymers which are most suitable are those which contain identical or different vinyl-type monomer units. By way of examples of such polymers, there may be mentioned the polyhydroxycarboxylates described in German Published Patent Application No. 1,904,940, filed on Feb. 1, 1969, in the name of DEGUSSA.

Particularly suitable hydroxycarboxylated polymers are those which contain monomeric units of the formula:

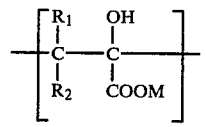

where $R_1$ and $R_2$ represent hydrogen or an alkyl group containing from 1 to 3 carbon atoms which can be substituted by a hydroxyl group or by a halogen atom, $R_1$ and $R_2$ being identical or different, and where M has the same significance as indicated above.

The polymers which can be used according to the present invention are preferably hydroxycarboxylated polymers such as previously defined where $R_1$ and $R_2$ represent hydrogen or a methyl group, $R_1$ and $R_2$ being identical or different. The best results are obtained with polymers where $R_1$ and $R_2$ represent hydrogen.

The hydroxycarboxylated polymers used in the present invention can be chosen from among the homopolymers and the copolymers containing units, such as defined previously, of the same type or of several different types. When copolymers are used, they are most often chosen from among those which contain at least 20% of units such as defined previously and, preferably, from among those which contain at least 50% of such units.

The best results are obtained from polymers which contain only units such as defined previously.

Among the copolymers which can be used are those which contain comonomer units derived from vinyl monomers substituted by groups chosen from among the hydroxyl and carboxyl groups. Advantageously, these copolymers contain acrylic units of the formula:

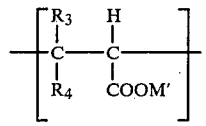

where $R_3$ and $R_4$ represent a hydrogen atom or an alkyl group containing from 1 to 3 carbon atoms and where M' has the same significance as the M given previously. Among these copolymers, it is preferable to use those containing acrylic units derived from unsubstituted acrylic acid where $R_3$ and $R_4$ represent hydrogen.

The average molecular weight of the polymers used is greater than approximately 300. It is generally between 2,000 and 1,000,000. The best results are obtained when it is between approximately 5,000 and approximately 800,000.

The hydroxycarboxylated polymers which can be used according to the present invention may be used in the form of salts of the polyhydroxycarboxylic acids or in the form of polyhydroxycarboxylic acids. In the latter case, they can be used in the form of the corresponding polylactones. The polylactones derived from polyhydroxycarboxylic acids which can be used in the practice of the present invention are inter- and/or intramolecular esters obtained by reacting the acid functional groups of the polymers with alcohol functional groups, the functional groups being partially or totally converted to lactone. The rate of conversion to lactone of the functional group in question is generally between 30 and 100%.

Particularly suitable polymers are sodium poly-alpha-hydroxyacrylate and the polylactone derived from poly-alpha-hydroxyacrylic acid.

The polymers used according to the invention can be prepared by any known method. An example of the preparation of these polymers is described in Belgian Pat. No. 817,678, filed on July 15, 1974, in the name of SOLVAY & CIE.

The process according to the present invention for the reclamation of waste paper can be performed with the presence of a single type of carboxylated polymer, preferably such as those previously described, or can be performed with the presence of mixtures of different carboxylated polymers such as those previously defined.

Mixtures of particularly effective carboxylated polymers which allow high degrees of whiteness to be obtained contain at least a hydroxycarboxylated polymer containing monomeric units of the formula:

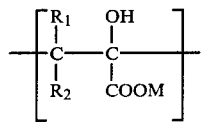

such as defined previously and at least another carboxylated polymer containing monomeric units of the formula:

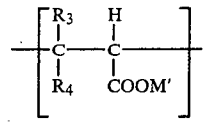

such as defined above. In this case, the preferred hydroxycarboxylated polymer containing the monomer units is a homopolymer containing monomeric units of the formula:

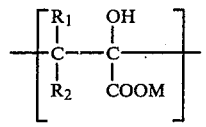

such as previously defined. The best results are obtained with a homopolymer in which $R_1$ and $R_2$ are identical and represent hydrogen. A particularly suitable polymer is sodium poly-alpha-hydroxyacrylate.

In the same way, the carboxylated polymer containing monomer units of the formula:

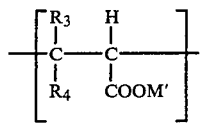

which is preferably used in mixtures of polymers is a homopolymer. The best results are obtained with a homopolymer in which $R_3$ and $R_4$ are identical and represent hydrogen. A particularly suitable polymer is polyacrylic acid.

The mixture of polyacrylic acid with sodium poly-alpha-hydroxyacrylate is particularly suitable.

When using mixtures of polymers such as those discussed above, the hydroxycarboxylated and carboxylated polymers can be used in various weight ratios which are usually between 100 and 0.01, these ratios generally depending on the nature of the polymers used and especially their respective solubilities. When using a mixture of sodium poly-alpha-hydroxyacrylate and polyacrylic acid, it has been established that the best results are obtained with weight ratios of sodium poly-alpha-hydroxyacrylate to polyacrylic acid of between 100 and 0.1, and preferably between 10 and 0.25. These relative proportions of the hydroxycarboxylated and carboxylated polymer are those which have given the greatest gains in whiteness, but it is understood that other proportions can be used and give a certain gain in whiteness with respect to the levels of whiteness obtained using the conventional processes for the reclamation of waste paper.

The total quantity of carboxylated polymers used generally is between 0.001 and 20% by weight relative to the weight of dry waste paper, and usually, it is between 0.01 and 10% by weight.

The reclamation processes for waste paper, in which the carboxylated polymers can be used according to the present invention, all comprise at least one disintegration stage for waste paper. This stage can possibly be followed by one or several other stages, such as supplementary disintegration, dispersion, bleaching, vat storage and breaking down of agglomerates and de-inking by flotation or by washing, the number of stages and their sequence depending on the types of waste paper to be reclaimed and the final desired level of whiteness.

Carboxylated polymers employed according to the present invention can be used in any stage of the reclamation process for waste paper. They can be employed in one and the same stage of the reclamation process, or, where appropriate, in several different stages.

When the reclamation process for waste paper comprises only a disintegration stage for waste paper without subsequent treatments, the carboxylated polymers used according to the present invention are introduced into the apparatus where the disintegration takes place, at the same time as the other reagents usually used for the reclamation of waste paper.

When the reclamation process for waste paper comprises several stages, the carboxylated polymers used according to the invention can be employed in at least one of the stages of the reclamation process such as disintegration, vat storage, bleaching and dispersion. One example of the reclamation process for waste paper in which the carboxylated polymers are used according to the present invention comprises grinding the waste paper in a grinding mill and then continuing the disintegration in a pulper working at a low pulp consistency. Another method of carrying out the process comprises disintegrating the waste paper in a pulper working at a low pulp consistency, thickening the pulp and then passing it into a bleaching tower; this latter stage may or may not be followed by a de-inking stage. Another technique comprises disintegrating the waste paper and then, after a possible thickening, passing the pulp into a disperser which may or may not be followed by a de-inking stage. Waste paper can also be disintegrated in a pulper, the pulp thus obtained de-inked and the pulp then submitted to treatment in a disperser. All these processes can, of course, include other intermediate stages, such as vat storage, thickening, trituration, etc. The carboxylated polymers used according to the present invention can also be employed in any other reclamation cycle for waste paper which is in itself known. In all these cases, the carboxylated polymers used according to the present invention are employed in at least one of the cycle stages.

The carboxylated polymers used according to the present invention are preferably introduced into the apparatus where the disintegration of waste paper takes place. In this way, their beneficial effect continues throughout the different stages of reclamation in the case where this latter reclamation contains other subsequent treatments.

Different types of aqueous alkaline solutions can be used for the reclamation of waste paper.

When the polycarboxylate used in the present invention is capable of conferring an alkaline pH to the solution, the polycarboxylate may be the only alkaline compound contained in the solution.

However, one or several other types of compound conferring an alkaline pH on the aqueous solution can also be introduced into the solution. The best results are obtained with alkali metal hydroxides, carbonates and silicates. The alkali metal hydroxides have shown themselves to be particularly advantageous. When a solution of alkali metal hydroxides is used, as, for example, sodium hydroxide, the hydroxide content is between 0.2 and 8% by weight of the weight of dry waste paper.

Advantageously, the aqueous alkaline solution can also contain a peroxidic compound. Suitable peroxidic compounds are the inorganic peroxidic compounds. Hydrogen peroxide has shown itself to be particularly suitable.

Good results are obtained when the aqueous alkaline solution contains, in addition to the carboxylated polymer, an alkali metal hydroxide, such as sodium hydroxide, and a peroxidic compound, such as hydrogen peroxide. The hydroxide content is then between 0.1 and 5% by weight, expressed as weight of dry waste paper, and the hydrogen peroxide content is between 0.05 and 5% by weight of the weight of dry waste paper. Mixtures of hydrogen peroxide with sodium hydroxide in aqueous solution are particularly advantageous.

Alkaline aqueous solutions containing a compound, which is at the same time alkaline and oxidizing in character, can also be used advantageously. The best results are obtained with alkali metal peroxides. Sodium peroxide has shown itself to be particularly suitable. Thus, for example, an aqueous solution of an alkali metal peroxide, such as an aqueous solution of sodium peroxide, can be used. In this case, the peroxide content most often is between 0.1 and 10% by weight of the weight of dry waste paper.

When the solution contains no peroxidic compound, the best results are obtained with hydroxycarboxylated polymers which contain monomeric units of the vinyl-type and preferably hydroxycarboxylated polymers which contain monomeric units of the formula:

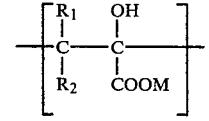

such as defined previously.

When the solution contains peroxidic compound, all the carboxylated polymers have shown themselves to be effective.

The aqueous alkaline solution can also contain other additives, such as, for example, collectors and foaming agents, when a subsequent stage of de-inking by flotation is anticipated, or dispersants when a stage of de-inking by washing is anticipated. It has been found, however, that collectors can be used in lesser quantities, or even omitted, without harming the effectiveness of the de-inking, when polymers are used according to the present invention.

The collectors most often used are fatty acids or mixtures of fatty acids. Collectors can be added at the rate of 0 to 5% by weight of the weight of dry waste paper.

Foaming agents are surface-active agents and more particularly anionic or non-ionic surface-active agents can be used. A list of surface-active agents is given in the book, "Surface Active Agents", by A. M. Schwarz and J. W. Perry. The foaming agents can be added at the rate of 0 to 2% by weight of the weight of dry waste paper.

Products which have at the same time the properties of foaming agents and the properties of collectors, as, for example, the sodium or potassium soaps, can also be used. Soaps can be added at the rate of 0 to 10% by weight of the weight of dry waste paper.

The dispersants used in the case of de-inking by washing are most often anionic, cationic or non-ionic surface-active agents. These in particular include the alkyl or aryl sulfates, sulfonates and polyether alcohols. They are generally added at the rate of 0 to 5% by weight of the weight of dry waste paper.

A composition which is suitable for the reclamation of waste paper contains from 0.001 to 20% by weight of carboxylated polymer such as defined previously, from 0.1 to 5% by weight of sodium hydroxide, from 0.05 to 5% by weight of hydrogen peroxide and from 0 to 10% by weight of other additives, relative to the weight of dry waste paper.

Another type of particularly suitable composition according to the present invention for the reclamation of waste paper contains from 0.001 to 20% by weight of hydroxycarboxylated polymer containing vinyl-type monomeric units such as defined previously, from 0.1 to 5% by weight of sodium hydroxide and from 0 to 10% by weight of other additives, relative to the weight of dry waste paper.

By additives are understood not only collectors, dispersants and foaming agents, such as those defined previously, but also stabilizing agents, pH regulators and basic compounds such as silicates. The carboxylated polymers used in the present invention can be added in the aqueous phase either separately or premixed with the other additives necessary for reclamation. If they are added separately, they can be added directly to the aqueous phase as solids, or predissolved in solvents, such as, for example, water or aqueous alkaline solutions.

The carboxylated polymers used in the present invention may also be premixed with at least some of the other additives necessary for the reclamation. Such premixes can be in the form of solution in a common solvent containing the carboxylated polymers and the other additives necessary for the reclamation, such as, for example, basic compounds, peroxidic compounds, certain pH regulators and conventional additives for the reclamation of waste paper. To this end, water is a suitable solvent.

The carboxylated polymers used in the present invention can also be employed in the form of solid premixes. In this case, it is particularly advantageous to prepare doses of suitable polymers and other additives and to put them into paper or cardboard containers which can be introduced in this way into the reclamation apparatus. This method reduces considerably the handling required in the reclamation unit.

When a mixture of carboxylated polymers are used in the practice of the present invention, these can be added either separately, in solid form or as solutions in water or in aqueous alkaline solutions, or premixed with each other or with the other constituents of the reclaiming medium. In this case, they can be added in the form of solid premixes or as a solution in water.

When they are added in solid form, either separately or premixed, the hydroxycarboxylated polymers can be advantageously employed in the form of the polyhydroxycarboxylic acids and more particularly in the form of the corresponding polylactones.

According to a preferred embodiment of the present invention, when the carboxylated polymers are added at the waste paper disintegration stage, this is carried out in any type of apparatus which is in itself known and suitable for this usage. Apparatus such as pulpers are very suitable. Other apparatus capable of disintegrating waste papers can also be used.

At the disintegration stage the temperature can vary within wide limits. It is usually between 15° and 150° C. The residence time for this process can vary and is generally between 0.001 and 2 hours.

When the pulper is used, the temperature is usually between 20° and 90° C., most often between 20° and 70° C. and preferably between 35° and 60° C. The residence time for this stage is usually between 0.1 minute and 2 hours and preferably between 10 minutes and 2 hours when the pulper functions discontinuously and from 0.5 minute to 1 hour when it is functioning continuously.

The consistency of the pulp is usually between 0.1 and 15% and preferably between 0.5 and 10%.

If the reclamation process comprises a vat storage stage and/or a tower bleaching stage in addition to the disintegration stage, the carboxylated polymers used in the present invention can be employed in at least one of these stages. If the carboxylated polymers are introduced into a storage vat or to a bleaching tower, the temperature in this apparatus is usually between 15° and 90° C. and preferably between 20° and 60° C. The residence time for this stage is usually from 10 minutes to 10 hours and the consistency of the pulp is generally between 0.1 and 50% and preferably between 1 and 45%. Other temperatures, times and pulp consistencies can, of course, also be suitable.

Another method comprises introducing the carboxylated polymers used in the present invention into the disperser when one is required for the reclamation process. In this case, the temperature therein is between 20° and 150° C. and preferably from 30° to 130° C., the residence time for this stage being between 0.01 minute and 1 hour and preferably between 0.05 minute and 30 minutes and the pulp consistency is between 1 and 50% and preferably between 3 and 40%.

The waste paper to which the process according to the invention applies can be of any type. Waste paper made from chemical, mechanical, thermomechanical or mechanochemical pulps can be used. Thus, in particular, old newspapers, magazines or mixtures of old newspapers/magazines in any proportions can be used.

It has been noticed that it is sometimes possible to obtain directly a ready-to-be-used pulp from the outlet of the pulper when using the process according to the present invention in a pulper, without having to resort to an ink elimination stage. Indeed, ink is no longer visible in the pulp obtained according to the process of the invention from the outlet of the pulper and for certain uses, such as the manufacture of newsprint, this pulp can be used just as it is. Furthermore, the use of carboxylated polymers according to the present invention allows a reduction or a complete omission of the collector agents which are usually added during the reclamation process. Thus, alkaline solutions containing the carboxylated polymers according to the present invention, and optionally, silicates and optionally foaming agent can advantageously be used, these solutions either being free from collectors or containing only reduced quantities of collectors.

When using the process according to the present invention, an appreciable gain in whiteness has been observed and a very marked reduction in the consumption of peroxide when the process is carried out in the presence of a peroxide.

The following examples are given by way of non-limiting illustrations in order to better demonstrate the remarkable results obtained when the process according to the invention is applied to the de-inking of waste paper. Examples 1, 2 and 3 have been carried out to demonstrate the effectiveness of all the carboxylated polymers in the process according to the present invention when they are used during the reclamation of waste paper by means of an aqueous alkaline solution containing a peroxidic compound. Example 4 has been carried out to demonstrate the effectiveness of vinyl-type hydroxycarboxylated polymers when they are used during the reclamation of waste paper by means of an aqueous alkaline solution free of peroxidic compounds.

EXAMPLE 1

The tests in this example were carried out in a laboratory pulper and in a laboratory flotation cell. The laboratory pulper used is an OBKIRCHER pulper which has a capacity of 10 liters. The normal working consistency is between 3 and 6%. The flotation cell which is used has a capacity of 15 liters and is of the VOITH type. For certain tests, namely tests 5A and 6B, a storage (maceration) stage was carried out between the disintegration stage and the flotation stage, in a vessel of approximately 20 liters capacity.

In one test, namely test 9B, the flotation stage was replaced by a washing stage to remove the ink. In this case, the pulp was successively diluted to a consistency of 2%, agitated, and then reconcentrated to a consistency of approximately 10% and this was repeated three times.

The tests in this example were carried out on a 90/10 mixture by weight of newspapers and magazines. These raw materials had the following characteristics:

TABLE I

|                  | Newspapers  | Magazines    |
|------------------|-------------|--------------|
| Type of printing | letterpress | photogravure |
| Ash content      | 1%          | 30%          |

The whiteness of disintegrated waste paper in water is equal to 46.1% and the whiteness of the disintegrated margins in water is 58.5% with respect to the whiteness of MgO measured by means of an Elrepho (Zeiss) reflectometer equipped with an R457 filter.

The paper is manually torn into pieces before being introduced into the pulper. Then the aqueous solution containing all the reagents except the hydrogen peroxide is added. The hardness of the water used to obtain the pulp is 10 German degrees of hardness. The consistency of the pulp thus obtained is 5%. The solution is heated to the desired temperature of 50° C. and mixed for one minute before the introduction of the hydrogen peroxide. Treatment in the pulper lasts for 20 minutes. At the end of the treatment in the pulper, a sample of pulp is removed in order to determine the peroxide used up and to measure the whiteness.

The pulp which has been removed from the pulper is then, if necessary, (Tests 5A and 6B), passed into a maceration vessel where it is held for 3 hours at 50° C. After maceration, a sample is removed in order to measure the whiteness and to determine the consumption of peroxide.

The pulp withdrawn from the pulper or possibly from the maceration vessel is diluted to approximately 0.8% consistency and treated in the flotation cell for forty minutes. After flotation, a sample is withdrawn in order to measure the whiteness. In certain cases the flotation was followed by an acidification by means of sulphuric acid to a pH of 5.5. A fresh measurement of whiteness was carried out on the acidified pulp.

The additives used and the results obtained are reproduced in Table II which follows.

Tests were carried out with sodium poly-alpha-hydroxyacrylate (SPHA) and with the polylactone derived from poly-alpha-hydroxyacrylic acid (PHAL).

Tests 1R and 2R were carried out by way of comparison without the use of a carboxylated polymer in the aqueous alkaline solution and Tests 3 to 9 were carried out according to the present invention.

TABLE II

| Tests | | 1R | 2R | 3 | 4 | 5 | | 6 | | 7 | 8[x] | 9[x] | |
|---|---|---|---|---|---|---|---|---|---|---|---|---|---|
| | | | | | | 5A | 5B | 6A | 6B | | | 9A | 9B |
| Pulper | | | | | | | | | | | | | |
| Additives: | | | | | | | | | | | | | |
| H₂O₂ | ⎫ | 1 | 1 | 1 | 1 | 1 | | 1 | | 1 | 1 | 1 | |
| NaOH | ⎬ | 1 | 1.3 | 1 | 1 | 1 | | 1 | | 1.3 | 1 | 1 | |
| Na silicate | | 5 | 5 | 5 | — | — | | — | | — | — | — | |
| SPHA | % | — | — | 1 | 1 | 1 | | 0.7 | | — | 0.7 | 0.7 | |
| PHAL | dry | — | — | — | — | — | | — | | 0.4 | — | — | |
| Collector: | waste | | | | | | | | | | | | |
| Potassium soap | newspaper | — | — | — | — | .1 | | — | | — | — | — | |
| OLINOR 042 | | 0.8 | 0.8 | — | — | — | | — | | — | — | — | |
| Foaming agent: | | | | | | | | | | | | | |
| PERATOM 121 | ⎭ | 0.15 | 0.15 | — | 0.15 | — | | 0.15 | | 0.15 | — | 0.15 | |
| Introductory pH | | 10.5 | 10.9 | 10.6 | 11 | 10.8 | | 10.7 | | | | | |
| Consumption of H₂O₂ | % | 62 | 76 | 40 | 43 | 40 | 40 | 52 | 52 | 64 | 56 | 51 | 51 |
| Whiteness | % MgO | 55.5 | 57.5 | 56.8 | 58 | 54 | 54 | 58 | 58 | 57.8 | 55.9 | 57.9 | 57.9 |
| Maceration | | none | none | none | none | | none | none | | none | none | none | none |
| Consumption of H₂O₂ | % | | | | | 60 | | | 61 | | | | |
| Whiteness | % MgO | | | | | 57.2 | | | 59.7 | | | | |
| Flotation | | | | | | | | | | | | | none |
| Whiteness | % MgO | 58.4 | 60.6 | 61.2 | 59.9 | 60.7 | 58.5 | 60.7 | 61.9 | 59.7 | 60.9 | 60.9 | |
| Washing | | none | none | none | none | none | none | none | none | none | none | none | |
| Whiteness | % MgO | | | | | | | | | | | | 59.1 |
| Acidification | | | | none | none | none | none | none | none | none | | none | none |
| Whiteness | % MgO | 59.9 | 62.2 | | | | | | | | 62.8 | | |

[x]Tests 8 and 9 were carried out with SPHA prepared according to the process described in Belgian Patent No. 786,464, filed on July 19th, 1972 in the name of Solvay & Cie., while Tests 3, 4, 5 and 6 were carried out with SPHA prepared according to the process described in Belgian Patent No. 817,678, filed on July 15th, 1974, also in the name of Solvay & Cie.

Examination of the results given in Table II shows that the consumption of peroxide in the pulper for an identical content of sodium hydroxide is always lower when carboxylated polymers are used according to the present invention.

Comparison of Test 3 with Test 1R shows that the use of SPHA allows the collector and the foaming agent to be omitted, while at the same time obtaining a degree of whiteness after disintegration and flotation greater than that obtained using collector and foaming agent.

Moreover, by comparing Tests 4, 6 and 9 with Test 1R, it can be established that the use of polymers according to the present invention allows not only the silicate but also the collector to be omitted.

Comparing Test 7 with Tests 1R and 2R shows that the PHAL readily takes the place of the silicate and the collector even at low doses.

Finally, comparison of Test 8 with Test 1R shows that the SPHA can take the place of, at the same time, the silicate and the collector and the foaming agent and give, in spite of this, a higher degree of whiteness after maceration.

An additional test was carried out under the same conditions as those of Test 6A, but with the sodium poly-alpha-hydroxyacrylate replaced by an identical quantity of polyacrylic acid. The whiteness obtained after disintegration and after flotation are comparable to those obtained in Test 1R in spite of a much lower introductory pH.

EXAMPLE 2

Tests were carried out in the same apparatus as that used in Example 1 and with the same quality of waste paper. The operating conditions were identical. The tests were carried out with a 25% aqueous solution of polyacrylic acid (PAC) commercially called VERSICOL E7.

The additives used and the results obtained are reproduced in Table III which follows.

TABLE III

| Test | | 12 | 13 |
|---|---|---|---|
| PULPER | | | |
| Additives | | | |
| $H_2O_2$ | | 1 | 1 |
| NaOH | % | 1 | 1 |
| Na silicate | dry | 5 | 5 |
| PHAL | waste | 0.1 | — |
| PAC (25% solution) | paper | — | 0.63 |
| PERATOM 121 | | 0.15 | 0.15 |
| introductory pH | | 10.9 | 11.0 |
| whiteness | % MgO | 56.9 | 57.3 |

Comparison of Tests 1R (Table II), 12 and 13 shows that, on the one hand, the use of PHAL or of PAC allows the collectors to be completely omitted and that, on the other hand, the whiteness obtained after disintegration is higher in the presence of PHAL and PAC.

EXAMPLE 3

Tests were carried out in the same apparatus as that used in Example 1 with the same quality of waste paper. The operating conditions were identical.

The results obtained are reproduced in Table IV which follows.

Tests 15, 16 and 17 were carried out with the polylactone derived from poly-alpha-hydroxyacrylic acid (PHAL) mixed with polyacrylic acid. Tests 14 and 18 were carried out with each of the polymers taken separately.

TABLE IV

| Test | | 14 | 15 | 16 | 17 | 18 |
|---|---|---|---|---|---|---|
| PULPER | | | | | | |
| Additives | | | | | | |
| $H_2O_2$ | | 1 | 1 | 1 | 1 | 1 |
| NaOH | % by | 1.08 | 1.2 | 1.2 | 1.16 | 1.2 |
| PHAL | weight | 0.64 | 0.48 | 0.32 | 0.16 | — |
| polyacrylic acid (25% solution) | of dry waste | — | 1 | 2 | 3 | 4 |
| Foaming agent: | paper | | | | | |
| PERATOM 121 | | 0.15 | 0.15 | 0.15 | 0.15 | 0.15 |
| introductory pH | | 10.8 | 10.8 | 10.8 | 10.8 | 10.8 |
| consumption of $H_2O_2$ | % | 42 | 47 | 55 | 57 | 92 |
| whiteness | % MgO | 58.1 | 58.9 | 59.2 | 58.5 | 56.6 |

Examination of the results given in Table IV shows that the use of the mixture of PHAL and polyacrylic acid (Tests 15, 16 and 17) allows a higher whiteness to be obtained at the outlet from the pulper than that obtained with PHAL (Test 14) or polyacrylic acid (Test 18) used separately. The whiteness obtained using the process is even higher than that of the disintegrated margins in water.

EXAMPLE 4

The tests were carried out in the same apparatus as that used in Example 1 and with the same quality of waste paper. The operating conditions were identical.

The additives used and the results obtained are reproduced in Table V which follows.

Test 10R was carried out by way of comparison. Tests 11 and 19 were carried out with, respectively, sodium poly-α-hydroxyacrylate (SPHA) and polyacrylic acid.

TABLE V

| Test | | 10R | 11 | 19 |
|---|---|---|---|---|
| Pulper | | | | |
| Additives | | | | |
| NaOH | % | 1 | 1 | 1 |
| Na silicate | dry | 1 | — | — |
| SPHA | waste | — | 0.7 | — |
| PAC (25% solution) | newspaper | — | — | 2.8 |
| Collectors | | | | |
| TPP (sodium tripolyphosphate) | | 0.15 | — | — |
| stearin | | 0.2 | — | — |
| oleic acid | | 0.2 | — | — |
| Foaming agent | | | | |
| PERATOM 121 | | 0.15 | 0.15 | 0.15 |
| introductory pH | | 10.8 | 11.1 | |
| whiteness | % MgO | 49.6 | 51.0 | 50.5 |
| Flotation whiteness | % MgO | 53.3 | 53.2 | 52.4 |

Comparison of Tests 10R and 11 shows that the vinyl-type polyhydroxycarboxylates, such as sodium poly-α-hydroxyacrylate, allow a better whiteness to be obtained after disintegration than that obtained with silicate and collectors. Furthermore, comparison of Tests 11 and 19 shows that the whiteness obtained in a basic medium containing no peroxide compound is better with the polyhydroxylacrylates, such as sodium poly-α-hydroxyacrylate than with polyacrylic acid.

Comparison of Tests 11 and 10R also shows that the use of SPHA allows collectors to be completely omitted.

It will be understood that the above description of the present invention is susceptible to various modifications, changes and adaptations, and the same are intended to be comprehended within the meaning and range of equivalents of the appended claims.

What is claimed is:

1. A process for the reclamation of waste paper comprising contacting the waste paper with an aqueous alkaline solution which contains at least one hydroxycarboxylated polymer, said hydroxycarboxylated polymer comprising a main carbon chain substituted by carboxy groups —COOM where M represents a substituent selected from the group consisting of hydrogen, an alkali metal atom and an ammonium group to deink fibers of the waste paper, and producing a paper from the deinked fiber.

2. Process according to claim 1, wherein the aqueous alkaline solution is contacted with the waste paper in the absence of a peroxide compound.

3. Process according to claim 1, wherein M represents the hydrogen atom.

4. Process according to claim 1, wherein the solution contains from 0.001 to 20% by weight of polymer relative to the weight of dry waste paper.

5. Process according to claim 1, wherein the hydroxycarboxylated polymer contains vinyl-type monomer units.

6. Process according to claim 5, wherein the hydroxycarboxylated polymer contains monomeric units of the formula:

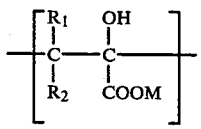

where $R_1$ and $R_2$ represent hydrogen or an alkyl group containing 1 to 3 carbon atoms which can be substituted by a hydroxyl group or by a halogen atom, $R_1$ and $R_2$ being identical or different.

7. Process according to claim 6, wherein the hydroxycarboxylated polymer is a homopolymer.

8. Process according to claim 7, wherein the hydroxycarboxylated polymer is sodium poly-alpha-hydroxyacrylate.

9. Process according to claim 6, wherein M represents hydrogen.

10. Process according to claim 9, wherein the polymer employed is at least partially in the form of a lactone.

11. Process according to claim 10, wherein the polymer is polylactone derived from poly-alpha-hydroxyacrylic acid.

12. Process according to claim 1, wherein the hydroxycarboxylated polymer contains monomeric units of the formula:

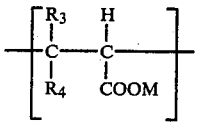

where $R_3$ and $R_4$ represent a hydrogen atom or an alkyl group containing 1 to 3 carbon atoms, $R_3$ and $R_4$ being identical or different.

13. Process according to claim 6, wherein a mixture of polymers is used containing at least said hydroxycarboxylated polymer and containing in addition at least one other carboxylated polymer containing monomeric units of the formula:

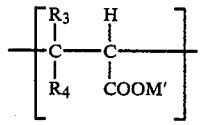

in which $R_3$ and $R_4$ represent a hydrogen atom or an alkyl group containing 1 to 3 carbon atoms, $R_3$ and $R_4$ being identical or different and where M' represents a substituent selected from the group consisting of hydrogen, an alkali metal atom or an ammonium group.

14. Process according to claim 13, wherein the mixture of polymers contains sodium poly-α-hydroxyacrylate and polyacrylic acid.

15. Process according to claim 13, wherein the mixture of polymers employed contains a polylactone derived from a poly-α-hydroxyacrylic acid and polyacrylic acid.

16. Process according to claim 1, wherein the solution additionally contains at least an alkaline compound chosen from the alkali metal hydroxides, carbonates and silicates.

17. Process according to claim 16, wherein the solution contains an alkali metal hydroxide.

18. Process according to claim 17, wherein the alkali metal hydroxide is sodium hydroxide.

19. Process according to claim 18, wherein the sodium hydroxide is used at the rate of 0.1 to 5% by weight relative to the weight of dry waste paper.

20. Process according to claim 1, wherein the solution additionally contains at least one inorganic peroxidic compound.

21. Process according to claim 20, wherein the peroxidic compound is hydrogen peroxide.

22. Process according to claim 20, wherein the peroxidic compound is sodium peroxide.

23. Process according to claim 21, wherein the solution contains from 0.05 to 5% by weight of hydrogen peroxide relative to the weight of dry waste paper.

24. Process according to claim 1, wherein the waste paper is disintegrated in at least one disintegration stage in a pulper.

25. Process according to claim 24, wherein the aqueous alkaline solution introduced into the pulper.

26. Process according to claim 24, wherein the temperature in the pulper is between 20° and 90° C.

27. Process according to claim 24, wherein the consistency of the pulp at the outlet from the pulper is between 0.5 and 10%.

28. Process according to claim 25, wherein the temperature in the pulper is between 20° and 90° C.

29. Process according to claim 25, wherein the consistency of the pulp at the outlet from the pulper is between 0.5 and 10%.

30. Process according to claim 5, wherein the aqueous alkaline solution contains from 0.001 to 20% by weight of hydroxycarboxylated polymer containing vinyl-type monomeric units, and from 0.1 to 5% by weight of sodium hydroxide, relative to the weight of dry waste paper.

31. Process according to claim 6, wherein the hydroxycarboxylated polymer contains at least 20% of said monomeric units.

32. Process according to claim 6, wherein the hydroxycarboxylated polymer contains at least 50% of said monomeric units.

33. Process according to claim 1, wherein the hydroxycarboxylated polymer contains polyacrylic acid.

* * * * *